C. J. MARTIN.
DRAFT EQUALIZER.
APPLICATION FILED JUNE 25, 1918.
1,295,781. Patented Feb. 25, 1919.
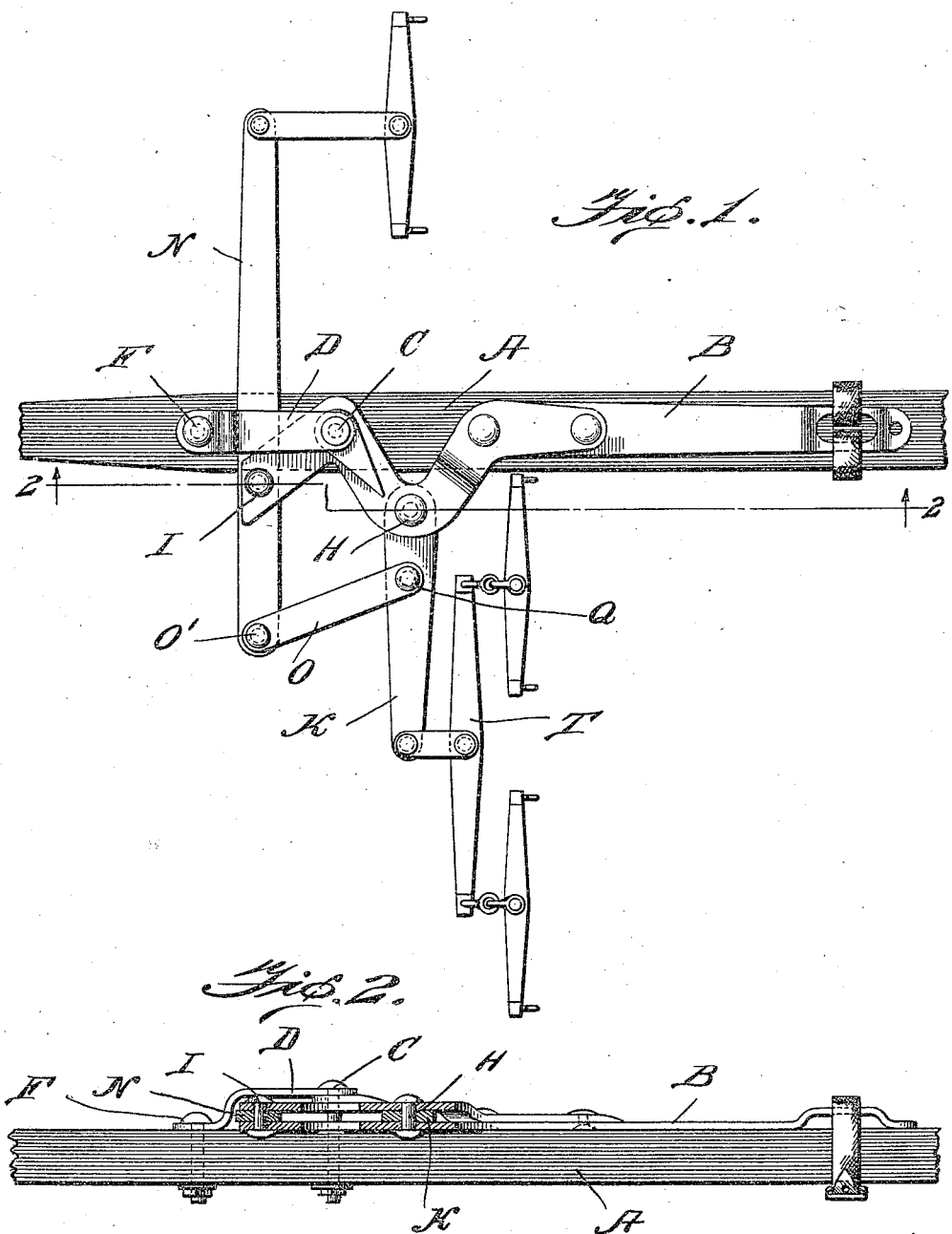

UNITED STATES PATENT OFFICE.

CHARLES J. MARTIN, OF HOLDEN, MISSOURI.

DRAFT-EQUALIZER.

1,295,781.   Specification of Letters Patent.   Patented Feb. 25, 1919.

Application filed June 25, 1918.   Serial No. 241,825.

*To all whom it may concern:*

Be it known that I, CHARLES J. MARTIN, a citizen of the United States, residing at Holden, in the county of Johnson and State of Missouri, have invented certain new and useful Improvements in Draft-Equalizers; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in draft equalizers, and consists essentially in the provision of a simple and efficient device of this nature so formed as to prevent side draft, made possible by a goose neck shaped arrangement to which the draft carrying levers are pivoted.

The present invention consists of a simple and efficient device of this nature having various details of construction, combinations and arrangements of parts which will be hereinafter fully described, shown in the accompanying drawings and then specifically defined in the appended claim.

My invention is illustrated in the accompanying drawings which, with the letters of reference marked thereon, form a part of this application and in which:

Figure 1 is a top plan view of my improved draft equalizer, and

Fig. 2 is a sectional view on line 2—2 of Fig. 1.

Reference now being had to the details of the drawings by letters:

A designates the tongue of a vehicle and B is a bar secured to the tongue at its forward end by being bolted or otherwise fixed thereto and its rear end is held by means of a pin C to which the forward end of a guard plate D is fastened, the rear of the plate being secured at F to the tongue. The rear portion of said guard plate D is goose neck-shaped and which latter is provided with an elongated slot. In the walls of the slot are mounted the two pivotal pins H and I. A two-horse draft lever K is mounted in said slot at its inner end and is pivotally mounted upon the pin H, while a one-horse draft lever N is mounted in the upper end of the slot and upon the pin I. Links O are pivotally connected to a pin O' mounted at the end of the short arm of the lever N and their other ends are pivoted to a pin Q passing through an aperture in the lever K intermediate its longitudinal center and its inner end, and a doubletree T is pivotally connected to the outer end of the lever K.

By the provision of a draft equalizer made in accordance with my invention, in which a goose neck-shaped bar is provided with the draft levers pivoted in the manner shown, side draft is avoided which would have a tendency to pull the wagon tongue against the horse connected to the swingle tree upon the one horse equalizing lever and thereby crowd the horse out of the track. But by my invention, this tendency to side draft is avoided. The pull upon the draft levers is balanced and the heavier the load, the greater side draft will come upon the lever to which the doubletree is secured, and also the greater the pull, the greater the side pressure will be at the back, and thus cause the parts to balance at all times.

What I claim to be new is:

A draft equalizer, comprising in combination with the tongue of a vehicle, a bar having laterally curved and angled portions which are provided with a continuous slot, a fastening means passing through the angled portion of the bar and secured to the longitudinal center of the tongue, draft bars pivotally mounted one at its inner end in the slotted part of the curved portion of the bar, and the other pivoted in the slot at the end of the bar, a link fastened at one end to the tongue and the other end to the angled portion of the bar in alinement with the tongue, and links pivotally connecting the draft bars.

In testimony whereof I hereunto affix my signature in presence of two witnesses.

CHARLES J. MARTIN.

Witnesses:
  J. C. WRIGHT,
  E. K. REDFORD.